Feb. 3, 1959

O. N. MINOT 2,872,664

INFORMATION HANDLING

Filed March 1, 1955

2 Sheets-Sheet 1

INVENTOR.
OTIS N. MINOT
BY
Kenway, Jenney, Witter & Hildreth
ATTORNEYS

INVENTOR.
OTIS N. MINOT
BY
Kenway, Jenney, Witter & Hildreth
ATTORNEYS

United States Patent Office 2,872,664

Patented Feb. 3, 1959

2,872,664

INFORMATION HANDLING

Otis Northrop Minot, Lexington, Mass.

Application March 1, 1955, Serial No. 491,470

9 Claims. (Cl. 340—174)

This invention relates to information handling, and provides a system in which sheets carrying information entered in code may be compactly stored and rapidly read by electrical circuit detecting means and without mechanical manipulation of the sheets.

In the system of this invention the information stored is represented by selected locations in a predetermined coordinate field layed out on a sheet which may be stored in a stacked array with other sheets. Reading the information from the sheets involves identifying the locations selected in entering the information. In this respect the representation of the information is similar to that in other well known information handling systems, such as the punched card system in which the information is coded into a pattern of perforations which are located in reading the card by electrical or pneumatic means, generally means involving passing the cards individually through a reading device. The uses for systems of this sort are manifold and diverse, and include the keeping of records, e. g. payroll records, and other accounting records; the classification and correlation of selected information on one or more selected topics, e. g. information compiled in studies of the natural sciences, and other uses where information capable of being recorded and represented by a code pattern of selected locations is to be quickly available.

In general, the information storage units of this invention consist of sheets of insulating material on which the selected locations in a coordinate field, which represent the information stored, are distinguished or identified by being electrically conductive. Convenient electrical connections extending through the sheet are placed at these locations. In reading the information from the sheet, the selected locations are identified by the circuits they create between electrically conductive contactors on one side of the sheet defining one set of ordinates, and contactors on the other side defining the other set of ordinates.

The contactors are preferably situated on insulating plates between which the sheets are placed, and the assembled sheets and plates may then be stacked to provide compact storage of the information carrying units. The contactors may extend to the edges of the plate so that electrical contact to them may easily be made, and each conductive location in each sheet may then be identified without disassembling the stock, by noting the existence of an electrical closed circuit between the contactors corresponding to its ordinates. So that spurious parallel circuits between any coordinate pair of contactors will not exist through other connected contactors which connect with the pair, the electrical connections in the sheets are unidirectionally conducting, as by including a rectifier.

To facilitate rapid reading of the information storage units in a stack without separately probing the individual conductors at the edges of the stack, corresponding contactors of the several sets are preferably connected in parallel by busses extending along the edges of the stack. Thus, each corresponding location on each of the several sheets is placed in parallel circuit between the pairs of busses connecting with the contactors defining their common coordinates, and to distinguish a location on one sheet from a corresponding location on another sheet, in parallel therewith, this invention also provides a selector circuit by which a circuit through a location in one sheet may be distinguished from a parallel circuit through a corresponding location on another sheet.

In general, the selector circuit provides for the superposing of an electrical signal selectively to all of the contactors of only one set whereby circuits through these contactors, and through the information carrying sheets contacting them, are distinct from circuits through other sheets.

This invention will be better understood from the following detailed description of the preferred embodiment selected for purposes of illustration and shown in the accompanying drawings in which.

In a typical embodiment of this invention each information storage unit consists of a sheet 10 of an insulating material on which the information is represented and coded by the arrangement of electrical connectors 12 in selected locations in a predetermined coordinate field. A set of contactors 14 placed on one side of the sheet defines one set of ordinates (designated herein for convenience, the L ordinates) and a set of contactors 16 placed on the other side of the sheet defines the other set of ordinates (designated the T ordinates).

Figure 3:
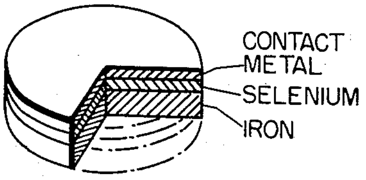
Fig. 3 is a perspective view partly in section of a unidirectionally conductive conductor which may be inserted in the sheets to mark the selected locations corresponding to information coded thereon.

The connectors 12 are preferably rectifiers, such as pellets formed from a sheet of iron having a coating of selenium and on the selenium a coating of a contact metal, as shown in Fig. 3, or other solid-junction-rectifier-combinations of materials well known in the art (see e. g. Knowlton, ed., Standard Handbook for Electrical Engineers, seventh edition, 1941, pp. 363–4). The pellets are formed to fit snugly into perforations in the sheet 10, and may be retained by the friction of the snug fit, or by being cemented into place. Inasmuch as the sheet, once the information has been entered on it, will be assembled between plates carrying the contactors and retained there in stacks, the pellets need only be secured in the perforations sufficiently well that the sheet can be handled and processed prior to assembling the stacks.

The entering of information on the sheets 10 involves providing a connector 12 at the desired locations in the coordinate field. Conveniently, the sheets may be preformed with a connector at every location in the field, in which case information would be entered by punching out the locations which are to be non-conducting. Alternatively, the sheet may be preformed with no connections, and information would then be entered by punching the appropriate locations and inserting a connector manually, or by machine.

Figures 4, 5:
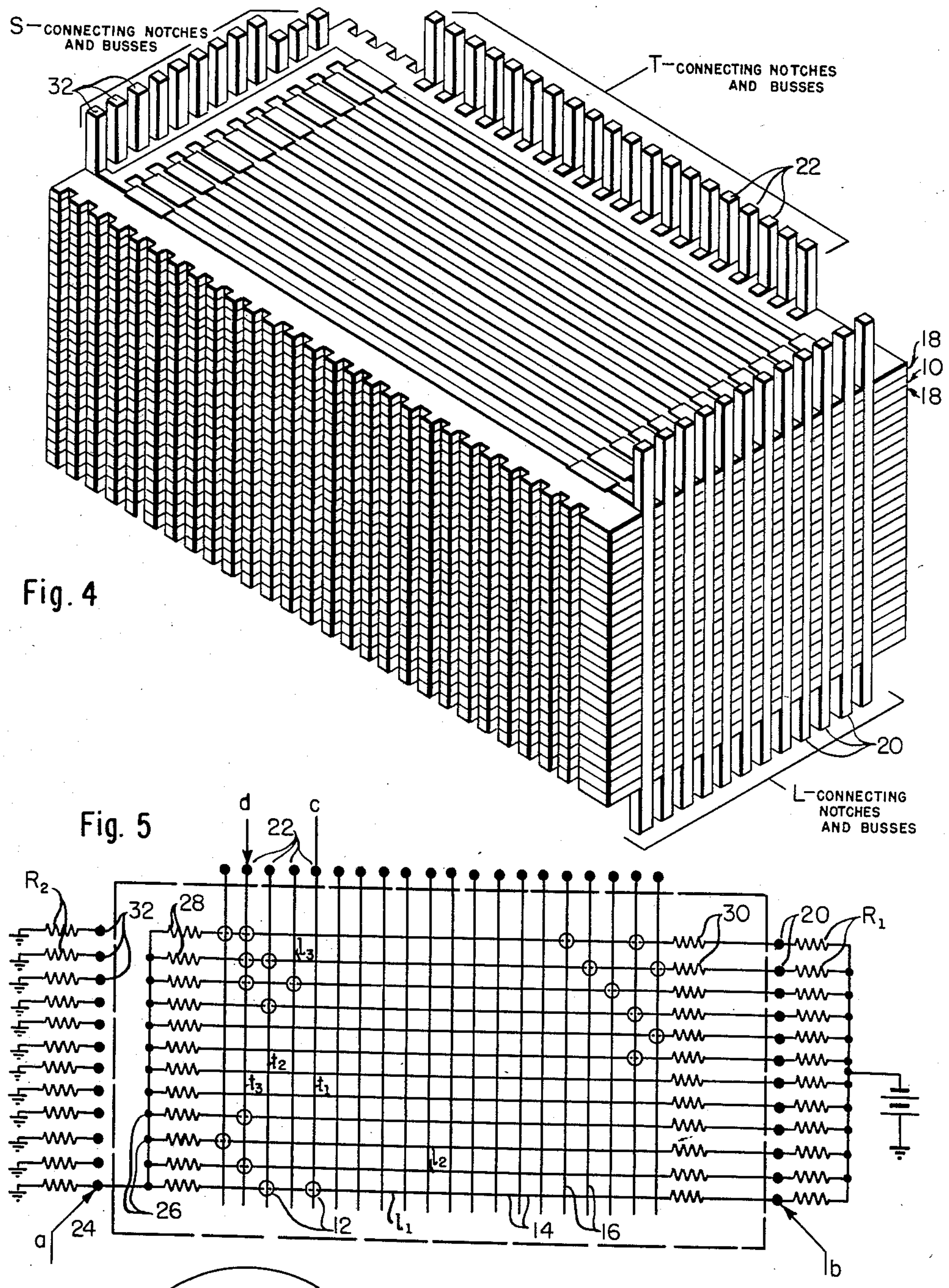
Fig. 4 is a perspective view of a stack of sheets and plates with the busses by which electrical connections to the information storage units may be made extending along their sides.
Fig. 5 is a schematic view showing the circuits in an information storage unit and an associated circuit by which information may be "read" out of the stacked array.

The plates between which the sheets 10 are assembled are preferably in the form of panels 18 having an L set of contactors 14 on one side and a T set of contactors 16 on the other side, so that several sheets may be stacked with a single panel between adjacent sheets. The contactors of each set extend to an edge of the panel, and terminate in notches formed at the edges. In this way notches along the most part of two edges of each panel each connect with a contactor. The notches of several plates in a stacked assembly define grooves running along the edge of the stack, in which busses may be accommodated to make contact with each corresponding contactor of the different sets as shown in Fig. 4. Thus, the busses 20 extending along the right side of the stack contact the L contactors and the busses 22 extending along most of the rear side contact the T contactors.

The edges of the sheets 10, it will be seen, are preferably correspondingly notched, to assure proper registration of the sheets with their adjacent panels.

Figure 1:
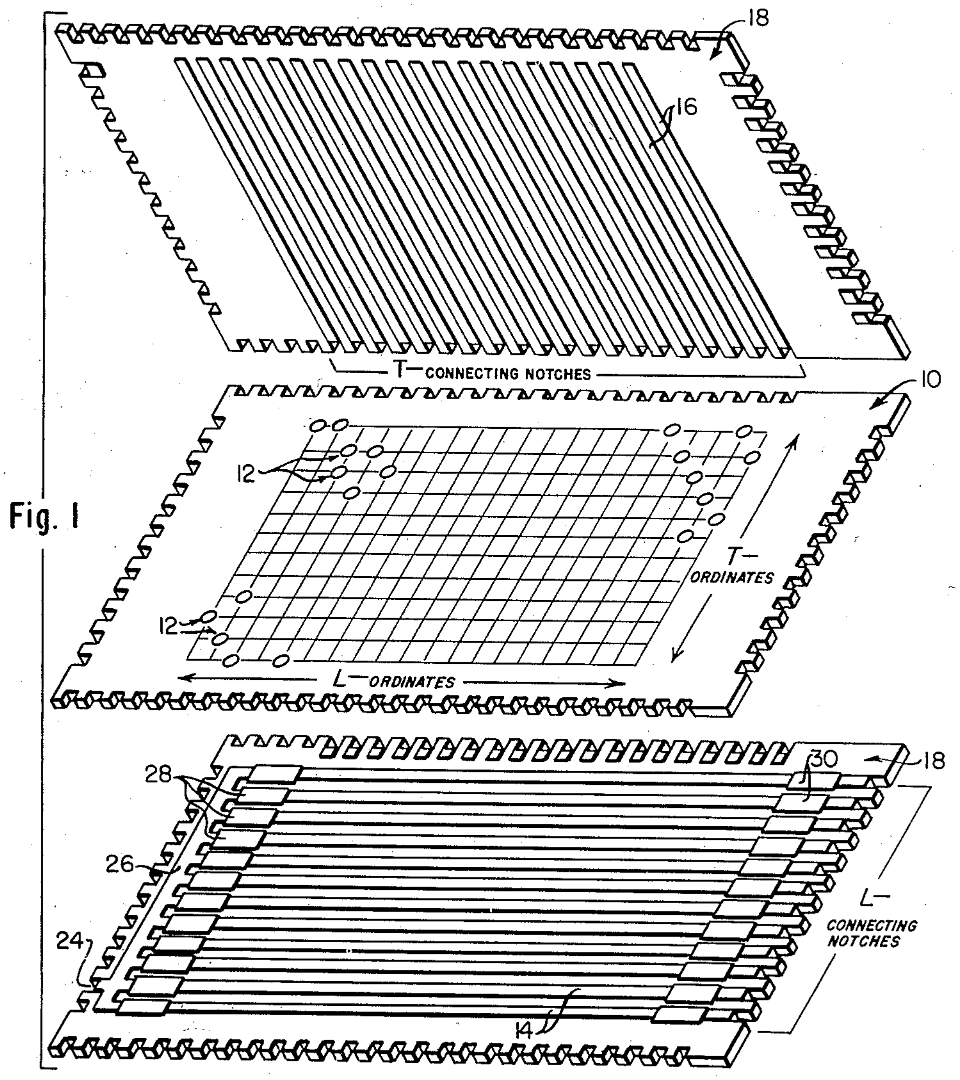
Fig. 1 is a perspective view of an information storage unit showing the top surfaces of the information storage sheet and the lower plate, and the lower surface of the upper plates, the plate surfaces being those in contact with the surfaces of the sheet.
Figure 2:
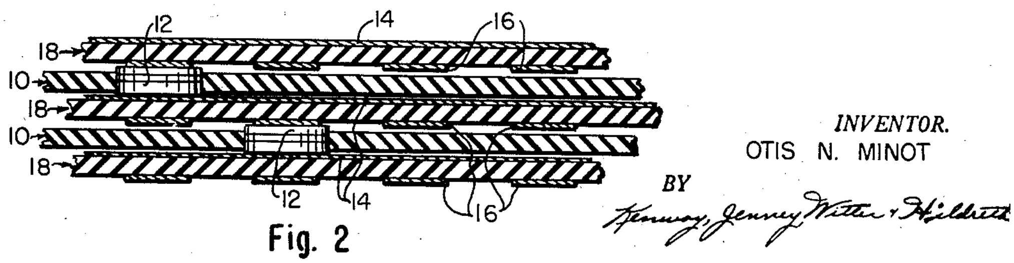
Fig. 2 is a cross-sectional view through a portion of a stack of plates and sheets showing the manner in which the contactors connect with conductors in the sheets.

With corresponding contactors of each set connected in parallel by the busses, circuits through corresponding connectors in the sheets in the stack are made simultaneously. To select or distinguish one storage unit from the others, each of the panels is provided with a selector terminal 24 (see Fig. 1) in one of the notches not connected to a contactor, with the selector terminal of each panel in a stacked assembly at a different location along the edge of the panel.

The selector terminal connects by a conductor 26 to one end of each of the contactors of one of the sets, as illustrated the L set 14 through an isolating resistor section 28, and each of these contactors also connects at its other end with a dropping resistor section 30 before entering its notch at the edge of the panel. The isolating resistors 28 and dropping resistors 30 serve as a voltage divider, so that the voltage on any L contactor 14 will be intermediate the voltages between the selector terminals 24 and the end terminal of the contactor 14, as is more fully explained below.

With this arrangement, selected connections to each L set of contactors may be made by providing busses 32, designated S busses, in the notches accommodating the selector terminals 24, thus creating an electrical circuit to each L set of contactors through the bus making contact with that set. With each selector terminal in a different notch, each S bus in a notch available for a selector terminal connects with only one set of L terminals, and the selected circuit created through each bus provides means for distinguishing one storage unit from the others.

The panels are conveniently formed of an insulating sheet material, such as polystyrene, with the contactors 14 and 16, conductors 26 and resistor sections 28 and 30, formed by standard printed circuit techniques; or by cementing strips of metal in place to form the contactors and conductors, with strips of carbon or other material of increased resistivity cemented in place to form the resistor sections.

With the sheets 10 and panels 18 formed as described above, information is stored by assembling the sheets between the panels, and inserting the L, T, and S busses in the grooves formed by the aligned notches, the busses at the right each connecting with corresponding L contactors, the busses at the rear each connecting with corresponding T contactors and the remaining S busses each connecting with one set of L contactors through a selector terminal. The stack is preferably subjected to a compressing force to assure contact between the connector pellets 12 and the contactors 14 and 16.

The reading of information from the stack of sheets 10 and panels 18 forming the several information storage units, involves generally identifying the circuits between coordinate L and T contactors established by connectors 12 in the sheet between the contactors, each L and T contactor defining a location in a coordinate field. With the corresponding L and T contactors connected in parallel by the busses 20 and 22, several circuits may exist between any pair of L and T busses, one for each sheet in the stack having a connector 12 at that L and T coordinate location. Each of these circuits may, however, be distinguished by applying an appropriate signal to an S bus 32 which makes connection with only one set of L contactors. Typically, therefore, in reading a particular location, a signal is applied simultaneously to the S bus 32 and the L bus 20 while means for detecting the simultaneous signals is connected to the T bus 22, where the triordination of the S, L and T busses defines the location being read.

A suitable reading circuit designed to provide a positive voltage on a T contactor only when positive voltages are applied simultaneously to the corresponding selector terminal 24 (connecting through a resistor 28 with each L contactor 14 of a set) and to the end of an L contactor connecting through a connector 12 to the T contactor, is shown in Fig. 5. The busses 20 connecting with the ends of the L contactors 14 each connect through a resistor $R_1$ to a common negative bias, while each of the selector terminals 24 connects through corresponding S bus 32 through a resistor $R_2$ to ground.

In reading a stack of storage units, a positive voltage is applied to the S bus 32 connecting with the L contactors of the sheet 10 to be read while simultaneously a positive voltage is applied to the L bus 20 connecting with the L contactor 12 defining the L ordinate of the location on the sheet to be read. The presence or absence of a positive voltage at the T bus 22 connecting with the T contactor defining the T ordinate of the location corresponds with the presence or absence of a connector 12 at that location. By repeating this operation for each location on each sheet in the stack, all the locations provided with connectors 12 may be determined and the information thereby carried decoded.

By way of illustration, and with reference to Fig. 5 which shows the circuit associated with one sheet in the stack (the contactors 14 and 16, the resistors 28 and 30 and conductor 26 being represented schematically), the resistors $R_1$ may be 0.25 megohm; $R_2$, 2 megohms; the isolating resistors 28, 0.5 megohm; the dropping resistors 30, 0.25 megohm; and the negative bias $-4$ volts. With no voltages applied to either the S busses 32 or the L busses 20, all the L contactors 14 will be at approximately $-4$ volts and no positive signal will appear on any T contactor 16 nor on any T bus 22. If now a voltage of $+2$ volts is applied to an S bus 32, as at *a*, and a similar $+2$ volts is applied to an L bus 20, as at *b*, so that the potentials at *a* and *b* are each $+2$ volts, the corresponding L contactor of the set connecting to the energized S bus, designated $l_1$ will have a voltage of $+2$ volts, and each T contactor connected to L contactor $l_1$ will also have a voltage of $+2$ volts, detectable at the corresponding T bus 22, e. g. at *c*. Those T contactors such as $t_3$ not connected to L contactor $l_1$, will not be so energized, and no positive voltage at their corresponding T busses e. g. at *d*, will be detected.

In this connection, a circuit between $l_1$ and *d* will not be created through T contactor $t_2$ (connecting to $l_1$) and L contactor $l_3$ (connecting to $t_3$ and $t_2$) because of the unidirectionally conductive characteristics of the contactors 12.

With signals applied as described above, it will be noted that L contactors which are not energized, such as $l_2$, will carry a voltage of about $-1$, by virtue of the positive voltage at the conductor 26 and negative voltage at the L bus 20, and T contactors connected to it, such as $t_3$, will not register a positive signal.

Other storage units in the stack will not be energized at their conductors 26 at the same time since their selector terminals will be in contact with S busses grounded through a resistor $R_2$. With the +2 volt potential at the L bus connecting L contactor $l_1$ and corresponding L contactors of other units in the stack, these other corresponding L contactors will be at a voltage of about 0 (their conductors 26 being at about −4 volts by virtue of the plurality of parallel paths between the biasing potential and the conductor 26) and the potential on the L contactors of other sets connecting to unenergized L busses will be about −4 volts. From this it will be seen that any unit of the stack may be chosen for selective reading by energizing the contactors of that unit, and then energizing the L busses while probing the T busses for the positive potential characteristic of a contactor being at the corresponding L and T coordinate location.

With the circuit described above in which positive voltages applied to the L contactors 14 comprise the signal to be read at the T contactors 16 it is, of course, necessary that the pellets, being unidirectionally conductive, be oriented to permit the desired signal to be transmitted. Thus, with pellets of iron-selenium-contact metal, the iron surface should be oriented to contact the L contactors since current flow through such a combination is from the iron to the selenium.

From the foregoing description of this invention, it will be seen that an easily constructed reliable and compact information storage system is provided which has the particular advantage of not involving manipulation of the individual storage units in the reading operation. Although a reading system involving manual probing of the various busses has been described, it is contemplated that in most cases rapidly acting electronic systems will be used to apply and detect the signals used in reading. Electronic systems of this type, being well-known in the art and not part of this invention, are not described in detail herein.

Although this invention has been described in detail with reference to a preferred embodiment, it is contemplated that modifications of construction will readily occur to those skilled in the art and that such modifications may be made without departing from the spirit and scope of this invention.

Having thus disclosed my invention and described in detail a preferred embodiment thereof, I claim and desire to secure by Letters Patent:

1. An information storage system comprising in combination a perforated sheet of insulating material having unidirectionally conductive connections in the form of thin rectifiers mounted within said perforations at selected locations in a predetermined coordinate field, a set of first conductive contactors at one side of the sheet defining one set of ordinates, each first contactor contacting one side of the connections located on the ordinate defined thereby, a set of second conductive contactors at the other side of the sheet defining a second set of ordinates, each second contactor contacting the other side of the connections located on the ordinate defined thereby, and means for making electrical connections selectively to each of the contactors.

2. An information storage system comprising in combination a perforated insulating sheet having unidirectionally conductive connections in the form of thin rectifiers mounted within said perforations at selected locations in a predetermined coordinate field, a first panel of insulating material having a set of first conductive contactors on a surface thereof in contact with one side of the sheet, said first contactors defining one set of ordinates with each first contactor contacting one side of the connections located on the ordinate defined thereby, a second panel of insulating material having a set of second conductive contactors on a surface thereof in contact with the other side of the sheet, said second contactors defining a second set of ordinates with each second contactor contacting the other side of the connections located on the ordinate defined thereby, and means for making electrical connections selectively to each of the contactors.

3. An information storage system comprising a sheet of insulating material having unidirectionally conductive connections at selected locations situated in a predetermined coordinate field, a set of first conductive contactors at one side of the sheet defining one set of ordinates, each first contactor contacting one side of the connections located on the ordinate defined thereby, a set of second conductive contactors at the other side of the sheet defining a second set of ordinates, each second contactor contacting the other side of the connections located on the ordinate defined thereby, a first set of first impedance elements each connecting to one end of one of the first contactors, a second set of second impedance elements each connecting to the other end of one of the first contactors, said first impedance elements and second impedance elements serving as a voltage divider whereby the voltage on each first contactor is intermediate the voltages at the ends of said impedance elements not connected with said first contactor, a conductor connecting the ends of said first impedance elements not connected with said first contactors together, whereby a voltage may be applied simultaneously through each of the first impedance elements to each of the first contactors, means for making an electrical connection to said conductor, means for making electrical connections selectively to the ends of said second impedance elements not connected with said first contactors whereby a voltage may be applied selectively to each of the first contactors through each of the second impedance elements, and means for making electrical connections selectively to each of the second contactors.

4. An information storage system comprising an insulating sheet having unidirectionally conductive connections at selected locations situated in a predetermined coordinate field, a first panel having a set of first conductive contactors in contact with one side of the sheet, said first contactors defining one set of ordinates with each first contactor contacting one side of the connections located on the ordinate defined thereby, a second panel having a set of second conductive contactors in contact with the other side of the sheet, said second contactors defining a second set of ordinates with each second contactor contacting the other side of the connections located on the ordinate defined thereby, the first panel having a first set of first impedance elements each connecting with one end of one of the first contactors and a second set of second impedance elements each connecting with the other end of one of the first contactors, said first impedance elements and second impedance elements serving as a voltage divider whereby the voltage on each first contactor is intermediate the voltages at the ends of said impedance elements not connected with said first contactor and a conductor connecting the ends of said first impedance elements not connected with said first contactors together, whereby a voltage may be applied simultaneously through each of the first impedance elements to each of the first contactors, means for making an electrical connection to said conductor, means for making electrical connections selectively to the ends of said second impedance elements not connected with said first contactors, whereby a voltage may be applied selectively to each of the first contactors through the second impedance elements, and means for making electrical connections selectively to each of the second contactors.

5. An information storage system comprising a stacked array of alternating sheets and panels, each of said sheets comprising an insulating sheet having unidirectionally conductive connections at selected locations situated in a predetermined coordinate field, and each of said panels comprising a plate of insulating material having a set of first conductive contactors on one side of the panel in contact with one side of an adjacent sheet, said first contactors defining one set of ordinates with each first contactor contacting one side of the connections located on the ordinate defined thereby, and a set of second conductive contactors on the other side of the panel in contact with one side of another adjacent sheet, said second contactors defining the other set of ordinates with each second contactor contacting one side of the connections located on the ordinate defined thereby, and means for making electrical connections selectively to each of the contactors.

6. An information storage system comprising a stacked array of alternating sheets and panels, each of said sheets comprising an insulating sheet having unidirectionally conductive connections at selected locations situated in a predetermined coordinate field, and each of said panels comprising a plate of insulating material having a set of first conductive contactors on one side of the panel in contact with one side of an adjacent sheet, said first contactors defining one set of ordinates with each first contactor contacting one side of the connections located on the ordinate defined thereby, and a set of second conductive contactors on the other side of the panel in contact with one side of another adjacent sheet, said second contactors defining the other set of ordinates with each second contactor contacting one side of the connections located on the ordinate defined thereby, each of said contactors extending to the edge of the panel and presenting an area to which selective electrical contact may be made.

7. An information storage system comprising a stacked array of alternating sheets and panels, each of said sheets comprising an insulating sheet having unidirectionally conductive connections at selected locations situated in a predetermined coordinate field, and each of said panels comprising a plate of insulating material having a set of first conductive contactors on one side of the panel in contact with one side of an adjacent sheet, said first contactors defining one set of ordinates with each first contactor contacting one side of the connections located on the ordinate defined thereby, and a set of second conductive contactors on the other side of the panel in contact with one side of another adjacent sheet, said second contactors defining the other set of ordinates with each second contactor contacting one side of the connections located on the ordinate defined thereby, a first set of first impedance elements each connecting to one end of one of the first contactors, a second set of second impedance elements each connecting to the other end of one of the first contactors, a conductor connecting through each of the first impedance elements to each of the first contactors, means for making an electrical connection to said conductor, means for making electrical connections selectively to each of the first contactors through each of the second impedance elements, and means for making electrical connections selectively to each of the second contactors.

8. An information storage system comprising a stacked array of alternating sheets and panels, each of said sheets comprising an insulating sheet having unidirectionally conductive connections at selected locations situated in a predetermined coordinate field, and each of said panels comprising a plate of insulating material having a set of first conductive contactors on one side of the panel in contact with one side of an adjacent sheet, said first contactors defining one set of ordinates with each first contactor contacting one side of the connections located on the ordinate defined thereby, and a set of second conductive contactors on the other side of the panel in contact with one side of another adjacent sheet, said second contactors defining the other set of ordinates with each second contactor contacting one side of the connections located on the ordinate defined thereby, a first set of first impedance elements each connecting to one end of one of the first contactors, a second set of second impedance elements each connecting to the other end of one of the first contactors, a conductor connecting through each of the first impedance elements to each of the first contactors, means for making an electrical connection to said conductor, each of said second contactors extending to the edge of the panel, each of said second impedance elements connecting to the edge of the panel, and each of said conductors extending to the edge of the panel with the conductor on each panel being located at a different place on the edge; a first set of busses extending along the edge of the stacked array and contacting corresponding second contactors on each panel; a second set of busses extending along the edge of the stacked array and contacting with corresponding first contactors through the second impedance elements; and a third set of busses extending along the edge of the stacked array each contacting the conductors selectively.

9. An information storage system comprising a stacked array of alternating sheets and panels, each of said sheets comprising an insulating sheet having unidirectionally conductive connections at selected locations situated in a predetermined coordinate field, the panels on one side of said sheets each comprising a plate of insulating material having a set of first conductive contactors in contact with one side of the adjacent sheet, said first contactors defining one set of ordinates with each first contactor contacting one side of the connections located on the ordinate defined thereby, the panels on the other side of said sheets each comprising a plate of insulating material having a set of second conductive contactors in contact with the other side of the adjacent sheet, said second contactors defining the other set of ordinates with each second contactor contacting one side of the connections located on the ordinate defined thereby and means for making electrical connections selectively to each of the contactors.

References Cited in the file of this patent

UNITED STATES PATENTS

| | | |
|---|---|---|
| 2,483,551 | Libman | Oct. 4, 1949 |
| 2,575,916 | Hobbs | Nov. 20, 1951 |
| 2,590,950 | Eckert | Apr. 1, 1952 |
| 2,655,625 | Burton | Oct. 13, 1953 |
| 2,677,814 | Miller | May 14, 1954 |
| 2,686,299 | Eckert | Aug. 10, 1954 |
| 2,717,373 | Anderson | Sept. 6, 1955 |
| 2,740,075 | Walker | Mar. 27, 1956 |